United States Patent [19]

Callahan et al.

[11] 4,056,846
[45] Nov. 1, 1977

[54] DATA PROCESSING SYSTEM WITH APPARATUS FOR SHARING CHANNEL BACKGROUND PROCESSING

[75] Inventors: Robert William Callahan; Paul Eugene Kauffman, both of Endwell; Lawrence Joseph Kobesky, Endicott; Howard Loomis Page, Apalachin, all of N.Y.

[73] Assignee: IBM Corporation, Armonk, N.Y.

[21] Appl. No.: 701,373

[22] Filed: June 30, 1976

[51] Int. Cl.$^2$ .............................................. G06F 3/04
[52] U.S. Cl. ............................................... 364/200
[58] Field of Search .................... 340/172.5; 445/1

[56] References Cited

U.S. PATENT DOCUMENTS

| 3,702,462 | 11/1972 | England | 340/172.5 |
| 3,801,962 | 4/1974 | Moore et al. | 340/172.5 |

Primary Examiner—Melvin B. Chapnick
Attorney, Agent, or Firm—W. S. Robertson

[57] ABSTRACT

In a data processing system having a plurality of channels that are organized for separately processing the operations of specific I/O devices and the operations that are background to these specific operations, apparatus for transferring the background processing from one channel to another channel to distribute the background processing load. A system of registers and lines connect these registers to the channels for controlling these operations. Each channel processor has a request register for use in designating that background processing has been completed and that processing of a device oriented portion of a channel program is to begin, and a completion register set by an associated I/O processor for use in signifying that processing of a device oriented portion of a channel program has been completed and that background processing is to begin.

4 Claims, 3 Drawing Figures

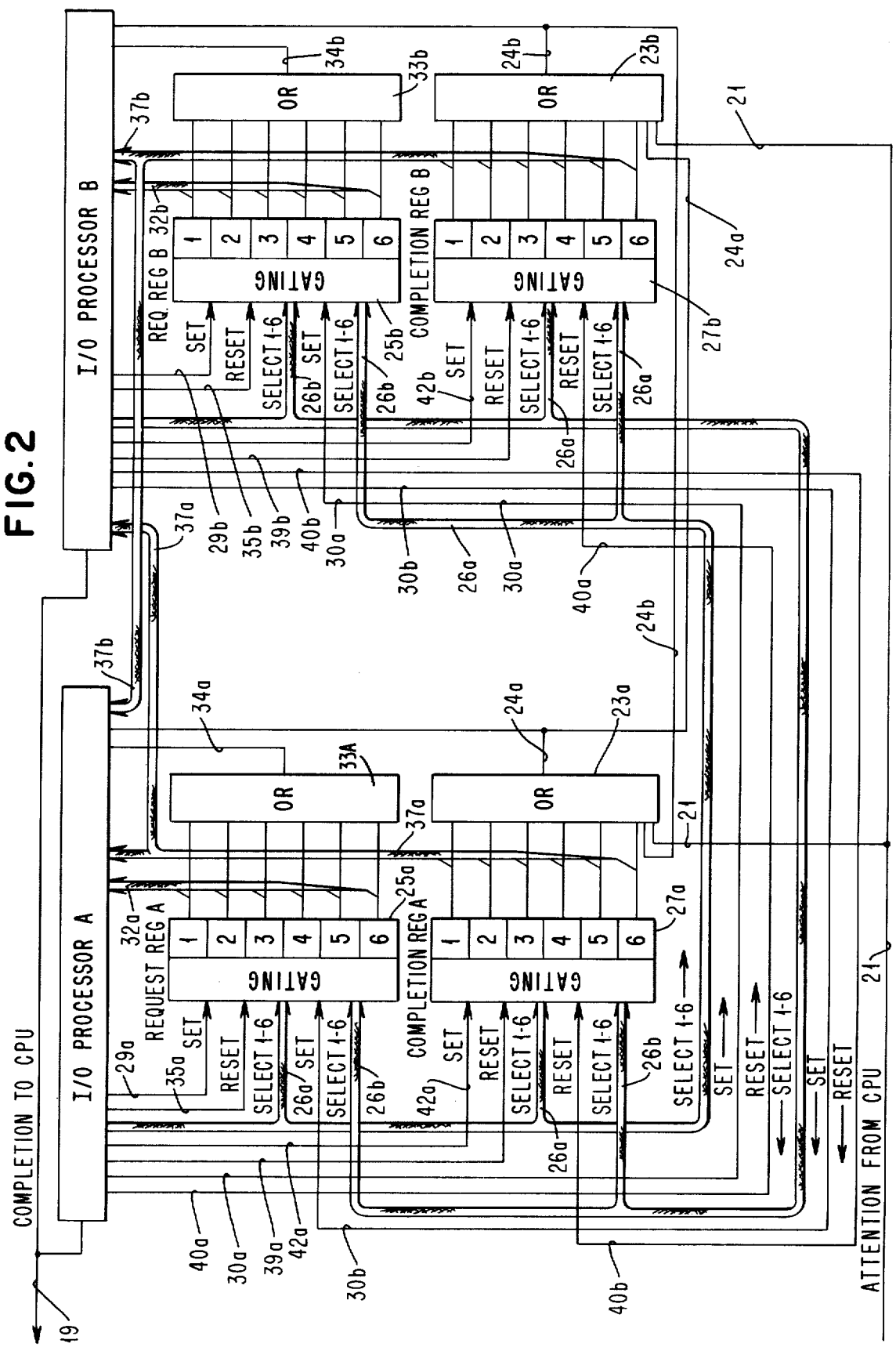

DATA PROCESSING SYSTEM WITH APPARATUS FOR SHARING CHANNEL BACKGROUND PROCESSING

RELATED APPLICATION

An application of R.W. Callahan, P. E. Kauffman and M. J. Mitchell, Jr. for "Address Match For Data Processing System", Ser. No. 701,400 assigned to the assignee of this invention, and filed on June 30, 1976 as this application discloses other improvements to a channel processor with which this invention may be used.

INTRODUCTION

This invention relates to an improvement in a channel processor (or "channel") for a data processing system. A channel is a component of a data processing system that executes a channel program for input/output (I/O) operations in a way that is more or less independent of the central processor. A channel is connected between a central processor and one or several controllers for I/O devices. (In a multiprocessing system, a channel may be connectable to various ones of several processors.) A channel has logic and storage circuits for accessing the main store of the central processor to fetch data words that are to be transferred to a controller and for storing data words that are read from a device or from buffer stores in a device controller. A channel also accesses the main store of the central processor for words that contain the commands of the channel program and for associated words. These storage access operations are initiated in response to signals from the central processor, signals from a controller, or in response to the operating status of the channel. A publication, "IBM System/370 Principles of Operation", GA22-7000-4, pages 185-239, describes the organization and operation of channels that may use the apparatus of this invention. Publications that describe specific channels are listed in a bibliography, "IBM System/370 Bibliography", form number GC20-0001, available from the assignee of this invention.

This invention is particularly intended for a channel that has a microprogrammed processor for executing the channel program. The processor can have separate microprograms for each of the controllers that is connected to the channel. The processor switches its operation from one program to another program in a fixed or variable sequence. The time interval for executing a portion of a particular program will be called a "time slice" without regard to the particular technique that is used for allocating processor resources to several concurrent programs. It is advantageous to arrange the microprogram for a particular time slice to handle only specialized parts of the channel program that are specific to a particular controller and to assign a separate time slice to execute the instructions that are common to each of the channel programs.

Such a channel has other resources, such as local storage, that are individual to a particular time slice and are not shared. From a more general standpoint, a channel has resources for device oriented operations and resources for background processing. A system of this type is described in U.S. Pat. No. 3,766,524, issued to Blayne E. Maring and assigned to the assignee of this invention.

An example of an I/O operation will help to illustrate the difference between background processing and device operations processing. (The example is based on a system of channel operations that are described in the cited publication.) An I/O operation can begin when the central processor encounters an instruction such as "Start I/O Fast Release" and signals the channel that is addressed by the instruction. The channel makes a fetch operation at a predetermined main storage address and fetches an address (in a Channel Address Word) of a first command which is contained in a Channel Command Word. The Channel Command Word permits a particular channel operation to begin. The processing up to this point is advantageously handled by the background time slice and the subsequent processing of the Channel Command Word is advantageously handled by a time slice having a microprogram that is specific for this operation.

Similarly, a channel operation has an ending sequence that stores a status word in main store as a result of further background processing.

OBJECTS OF THE INVENTION

More specifically, in the system that will be described, a channel processor operates with six time slices for device oriented processing and a seventh time slice for background processing. In such a system a problem can occur that a background time slice can become overloaded and thereby cause delays in the initiation of operations of the I/O devices or in reporting the completion of a channel program to the programming system of the central processor. An object of this invention is to provide a new and improved channel system that permits background processing to be handled by any channel processor without regard to the relationship that otherwise exists between the channel processor and the device for which the background processing is performed.

SUMMARY OF THE INVENTION

This invention provides means for communicating between one or more processors (which may include several processors in a multiprocessing system) and two or more channel processors so that any channel processor can respond to a signal from the central processor and perform the background processing that occurs at the beginning of a channel program.

In the embodiment of the invention that will be described later, each channel processor has a register called a Request Register for holding a bit for each of its controllers to designate that background processing has been completed and that a device oriented portion of the channel program is to begin. Each channel processor also has a register called a Completion Register for holding a bit for each of its controllers that signifies that a device oriented portion of a channel program has been completed and that background processing is to take place. The Request Register is connected to be set from any channel processor and the background microprogram is arranged to set the appropriate bit in the request register of the appropriate channel processor when background processing has been completed. The output of the Request Register signals the time slice for the associated controller that device oriented processing is to begin.

A Completion Register is connected to be set by the associated I/O processor and each device oriented time slice has microprogramming for setting its bit in the completion register when the operation is to be transferred to a background time slice. The output of a Completion Register is connected to each of the I/O processors so that any background time slice can respond to the completion register and begin background processing.

THE DRAWING

FIG. 2 is a logic diagram of the registers and associated interconnections of this invention for sharing background processing resources between two I/O processors.

THE SYSTEM OF THE DRAWING

Figure 1:
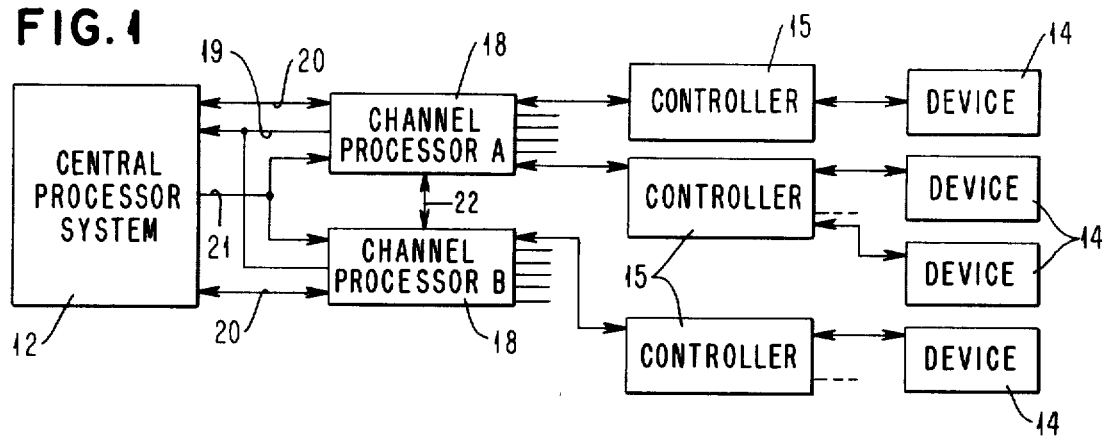
FIG. 1 is a block diagram of a conventional data processing system having the channel resource sharing operations and apparatus of this invention.

Introduction - FIG. 1

FIG. 1 shows a central processor 12 that operates with a number of I/O devices 14. Central Processor 12 may be a multiprocessor. Each device is associated with a controller 15, and one controller can be connected to a number of devices. Each controller is connected to a channel processor 18. The drawing illustrates two channel processors that will be designated Channel Processor A and Channel Processor B. In the example of the drawing, each channel processor has connections to six controllers. (These connections may be changed in operations that are independent of the apparatus of this invention.) Each channel processor is connected by suitable means 20 to access main storage of the central processor. The components of the system that have been described so far are conventional and are well known in a variety of forms that can be used with the apparatus of this invention.

The central processor has means for signalling a channel processor that an I/O operation is to begin, and according to this invention, this signal is transmitted to each of the channel processors by means shown in FIG. 1 as a line 21. In the same manner the channel processors each have means for signalling the central processor on a line 19 that completion status has been transmitted to the central processor (or processors). A connection 22 between Channel Processor A and Channel Processor B permits sharing the resources for background processing, as is shown in detail in FIG. 2.

The System Of FIG. 2

FIG. 2 shows I/O Processor A, I/O Processor B, the signal line 21 from the central processor, and interconnecting components that are represented in FIG. 1 by line 22. The I/O processors are conventional, and their components and operations will be described only as they relate to the other components and interconnections of the drawing. The interconnecting components for each I/O processor are preferably identical and corresponding components have the same reference number with an identifying suffix $a$ or $b$.

An OR circuit 23a, 23b receives the signal from the central processor on the line 21 which was introduced in the description of FIG. 1, and each OR circuit 23a, 23b produces an output on a line 24a, 24b to the associated I/O processor. (The output of each gate 23a, 23b is connected to an input of the other gate and the two gates 23a, 23b are logically equivalent to a single gate.) The signal on line 24a, 24b is an attention signal to the background time slice of the processor. In response to this signal, a background time slice, if it is not busy, begins a conventional operation to access a predetermined location in main storage and fetch a word, such as a Channel Address Word, that begins an I/O operation. Preferably the word or words that are to be fetched are located in a queue in a portion of main storage (sometimes called bump storage) that is accessible only to the system and not to user programs, and preferably the words in the queue are fetched by means of an instruction called Fetch And Set. Thus, if the background time slices for both I/O processors are not busy and both access the queue, they will receive successive entries one at a time in the queue or one will fetch the last entry in the queue and the fetch operation by the other I/O processor will be inhibited by the fall of the signal on line 21 as the queue becomes empty (and the Completion Register is reset, as explained later). Procedures for maintaining queues in a data processing system by means of software are well known and a variety of suitable techniques will be readily apparent for use with the apparatus of this invention.

Figure 3:
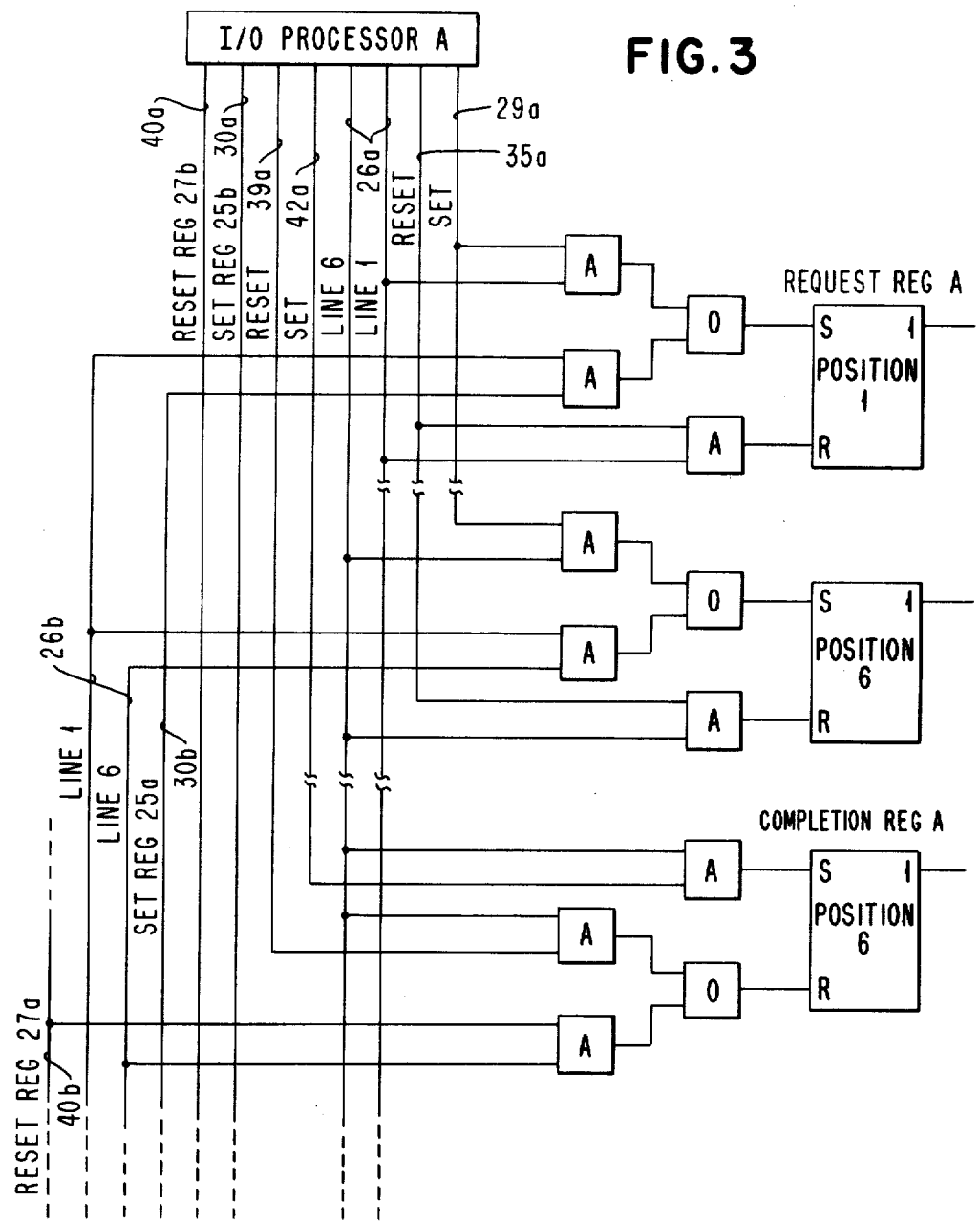
FIG. 3 is a logic diagram that illustrates the connections to the registers of FIG. 2.

The background time slice of either Processor A or Processor B handles a request signalled on line 21 without regard to whether the I/O device that is addressed by the I/O instruction is otherwise associated only with Processor A or Processor B. The information that is developed by the background time slice and is necessary for the continuing operation of the channel program by device oriented microprogramming is transferred from the background time slice to the device oriented time slice by means of queues in processor storage. The apparatus of FIG. 2 permits the background time slice of either I/O Processor A or B to signal the appropriate time slice to fetch this information to continue the channel program. Each I/O processor has a register 25a, 25b called a Request Register that has one bit position for each of the six device oriented time slices. The bit positions are shown as blocks with the number of the associated time slice. Representative portions of the gating circuits for registers 25a, 25b and for registers 27a, 27b are shown in FIG. 3. FIG. 3 will be readily understood without specific description. Registers 27a, 27b are described later but will be referred to in this description where their connections are related to the connections of Request Registers 25a, 25b. A six wire output bus 26a, 26b from each I/O processor identifies a bit position of the register that is to be addressed and each bus 26a, 26b is connected to the input gating circuits of the four registers. A bus 26a, 26b carries the output of a data store of the associated I/O processor and it is loaded when an appropriate word is fetched from the store. (A variety of functionally equivalent apparatus is well known.) An I/O processor produces a signal set on a line 29a, 29b to set its request register, and it produces a signal set on a line 30a, 30b to set a stage of the Request Register of the other I/O processor. The register set lines 29a, 29b, 30a, 30b are controlled from the output of the control store of the I/O processor and a signal appears on a line to set a stage of one of the registers when a point has been reached in the channel program at which a sequence of background processing has been completed and a sequence of device oriented processing is to be performed by the time slice that is associated with a particular device or controller.

The six output lines from each Request Register form a bus 32a, 32b that is applied to the corresponding I/O processor. These lines represent the status of requests for processing that is to be performed by the device oriented microprograms, and an OR circut 33a, 33b produces an attention signal on a line 34a, 34b when any bit of the associated Request Register is set. When line 34a or 34b is at a 1 logic level, the device oriented time slices are controlled to test the status signals on the associated bus 32a, 32b. As part of the microcode operations for such a test, a time slice loads a word on bus 26a, 26b that has a 1 bit in a corresponding position and it produces a reset signal on a line 35a, 35b to reset its stage of the Request Register.

Thus, the interconnecting components that have been described so far permit the background processing resources of any I/O processor of the system to be signalled by the central processor (or processors) to begin background processing, and they permit the background processing resources of any I/O processor to thereafter signal a particular I/O processor that processing is to be continued by the device oriented resources of the I/O processor. The converse operation will be described next in which the device oriented portion of a channel program signals that background processing is required.

A Completion Register 27a, 27b, introduced earlier, has a bit position for each device oriented time slice of the associated I/O processor. The outputs of a register 27a, 27b are applied to the OR gate 23a, 23b to produce the attention signal on lines 24a and 24b to the background time slice of each I/O processor when a bit is set in a Completion Register. The outputs of each register 23a, 23b also form a status bus 37a, 37b that supplies the contents of each Completion Register to each I/O processor. Time slice 7 responds to a signal on line 24a and 24b in the way described already and it also tests the contents of each Completion Register bus 37a and 37b to identify the time slice that has set a Completion Register. The absence of a set stage in any Completion Register signifies that the request for background processing is from the central processor as already described. This arrangement provides priority of the device over the central processor for background processing as is commonly desirable. When a background time slice responds to a signal on line 24a and 24b, it raises a reset line 39a, 39b or 40a, 40b and loads bus 26a, 26b (as already described) to reset the appropriate register stage if that queue is now empty.

A stage of the Completion Register 27a, 27b is set at the end of the device oriented portion of a channel program. A device oriented microprogram loads the bus 26a, 26b with its identifying bit and produces a set signal on line 42a, 42b to set the Completion Register associated with the time slice. After the work for a channel program is completed the background time slice signals the processor on line 19 that completion status has been stored in processor storage.

Thus the apparatus of this invention provides communication between two I/O processors for sharing background processing. The apparatus is readily adaptable to a wide variety of data processing systems by variations in the preferred embodiment that will be apparent to those skilled in the art within the scope of the claims.

What is claimed is:

1. In a data processing system having a plurality of I/O processors each having a time slice operation with a plurality of time slices for executing portions of channel programs oriented to a particular I/O device for each time slice and one time slice for executing background portions of all channel programs, the improvement comprising, means connecting each of said I/O processors to receive an attention signal from a central processor for beginning processing by the background time slice of any I/O device,
   each of said I/O processors having a first register having a bit position for each device oriented time slice of the associated I/O processor,
   means connecting the input of said first register to each of said I/O processors to be set by a background time slice in a bit position identifying one of the device oriented time slices for which background processing has been completed by any background time slice,
   means connecting the output of said first register to the associated I/O processor to identify the device oriented time slice for which the background processing has been completed,
   means connecting the input of said first register to the associated I/O processor to be reset when a device oriented resource has responded to the output of said first register,
   a second register for each I/O processor having a bit position for each device oriented time slice of the associated I/O processor,
   means connecting said second register to be set by a device oriented time slice of the associated I/O processor when device oriented processing has been completed,
   means connecting the output of said second register to each I/O processor to signal any background time slice that background processing is required by a particular device oriented time slice of the I/O processor and,
   means connecting the input of said second register to be reset by any background time slice.

2. In a data processing system having a plurality of I/O processors and having a plurality of I/O devices each associated with a predetermined one of said I/O processors, said I/O processors each having concurrently operable resources for executing portions of channel programs oriented to particular I/O devices and for executing background portions of channel programs, the improvement comprising, means connecting each of said I/O processors to receive an attention signal from a central processor system signifying that background processing is to be performd by any available I/O processor for a channel program for a selected I/O device,
   a first register for each of said I/O processors having an input and an output and having a bit position for each of said concurrently operable resources for device oriented portions of channel programs of the associated I/O processor,
   means connecting the input of said first register to each of said I/O processors for setting a bit position identifying one of said device oriented resources for which background processing has been completed by any of said I/O processors,
   means connecting the output of said first register to the associated I/O processor to identify the device oriented resource for which the background processing has been completed, and
   a second register for each of said I/O processors having an input and an output and means connecting said second register with each I/O processor to signal every I/O processor that device oriented processing has been completed and that further background processing is to be performed by any available I/O processor.

3. The data processing system of claim 2 wherein said first means includes means connecting the input of said first register to the associated I/O processor to be reset when a device oriented resource has responded to the output signal.

4. The data processing system of claim 3 wherein said second means comprises, a second register for each I/O processor having a bit position for each of said concurrently operable device oriented resources of the associated I/O processor and having an input and an output, means connecting the input of said second register to be set by the associated I/O processor when device oriented processing has been completed, means connecting the output of said second register to each I/O processor to signal that background processing is required by a channel program associated with a particular resource of the I/O processor, and, means connecting the input of said second register to be reset by a background processing resource.

* * * * *